United States Patent
Harada et al.

(12)

(10) Patent No.: US 6,420,853 B1
(45) Date of Patent: Jul. 16, 2002

(54) BATTERY CHARGER CAPABLE OF ACCURATELY DETERMINING FULLY CHARGED CONDITION REGARDLESS OF BATTERIES WITH DIFFERENT CHARGE CHRACTERISTICS

(75) Inventors: Hidekazu Harada; Kenrou Ishimaru; Nobuhiro Takano, all of Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/963,515

(22) Filed: Sep. 27, 2001

(30) Foreign Application Priority Data

Nov. 17, 2000 (JP) .......................... 2000-350718

(51) Int. Cl.[7] ................................ H02J 7/14
(52) U.S. Cl. ..................................... 320/161
(58) Field of Search ................. 320/162, 161, 320/163, 164

(56) References Cited

U.S. PATENT DOCUMENTS 5,642,030 A * 6/1997 Seelye ....................... 320/101

FOREIGN PATENT DOCUMENTS

| JP | 5-33667 | 12/1993 | ............. H02J/7/10 |
| JP | 7-184329 | 7/1995 | ............. H02J/7/10 |
| JP | 3048755 | 3/2000 | ............. H02J/7/10 |

\* cited by examiner

*Primary Examiner*—Gregory Toatley
(74) *Attorney, Agent, or Firm*—Sughrue Mion, PLLC (57) ABSTRACT

To provide a battery charger capable of fully charging both an active battery and an inactive battery, which have different charging characteristics near the peak level, a voltage across the battery is periodically sampled during charging the battery. A voltage change is obtained by subtracting a voltage that has been sampled previously from the newly sampled voltage. Determination of the fully charged condition of the battery is made when a voltage change falls below a critical value (S1, S2) after identifying that the battery being charged is an active or inactive battery using another critical values (K1, K2 or K1', K2'). The critical values S1 and S2 and another critical values K1 and K2 (or K1' and K2') are selectively referred to depending to the battery voltage change.

11 Claims, 4 Drawing Sheets

BATTERY CHARGER CAPABLE OF ACCURATELY DETERMINING FULLY CHARGED CONDITION REGARDLESS OF BATTERIES WITH DIFFERENT CHARGE CHRACTERISTICS

BACKGROUND OF THE INVENTION

1. Field of the Invention

The present invention relates to a battery charger for charging batteries, such as nickel-cadmium batteries and nickel-hydrogen batteries, which are used as power sources for hand-held electric devices, such as cordless power tools.

2. Description of the Related Art

It is essential for battery chargers to determine, during a charging process, that a battery has reached a fully charged condition and to stop charging the battery at the time thereof. One method of determining the fully charged condition is a so-called "–ΔV detection method", in which the battery is determined to be fully charged when the battery voltage drops a predetermined voltage (ΔV) from the peak level. To this end, the voltage $V_{in}$ across the battery is sampled at every predetermined period, and whenever the detected battery voltage $V_{in}$ exceeds the ever occurring maximum voltage, the data recorded as the maximum voltage is updated. When the battery voltage $V_{in}$ drops the predetermined voltage ΔV from the maximum voltage, the battery is determined to be fully charged.

Japanese Patent Application Publication (Kokai) No. HEI-7-184329 describes a "two-step detection method", in which the battery is determined to be fully charged when the battery voltage change exceeds a first predetermined critical value K, and thereafter falls below a second predetermined critical value S. To this end, the voltage across the battery is sampled at every predetermined period, and a previously detected voltage is subtracted from the newly detected voltage to obtain a gradient of the battery voltage, i.e., a battery voltage change. Generally, as the charging progresses, the battery voltage change increases, reaches the peak, and then goes down. The peak of the battery voltage appears at some point while the battery voltage change gradually goes down after having reached the peak of the voltage change. Therefore, by identifying the point with a particular value of the battery voltage change (i.e., the second predetermined critical value) corresponding to the peak of the battery voltage, the fully charged condition of the battery can be known.

Generally, there is less danger that the batteries will be overcharged with the two-step detection method than with the –ΔV detection method. However, the accuracy in detection of the fully charged condition with the two-step detection method is not assured if there is a change in the charge characteristics of the batteries.

Batteries subject to charging with the charger include active batteries and inactive batteries, which are classified in terms of the use circumstance. Batteries that are normally discharged through the use with electrically powered products are herein referred to as active batteries. Inactive batteries are such batteries that have been left unused for a long period of time, causing the battery to discharge. Active and inactive batteries exhibit different charge characteristics. Further, nickel-hydrogen batteries and nickel-cadmium batteries also exhibit different charge two characteristics.

When the battery charger with the first and second critical values K and S set for the inactive battery is used for charging the active battery, the fully charged condition of the active battery will be detected after the battery voltage peak level has passed, resulting in overcharging the active batteries. On the other hand, when the inactive battery is charged with the first and second critical values K, S set for the active batteries, there is a possibility that the voltage change never reaches the first critical value K, resulting in overcharge of the inactive batteries. Even if the first critical value K is reached, the second critical value S may be reached before the battery voltage reaches the peak level, resulting in undercharging the inactive batteries.

SUMMARY OF THE INVENTION

It is an object of the present invention to provide a battery charger capable of reliably and accurately charging batteries to a fully charged condition regardless of the type and kind of the battery.

In order to achieve the above and other objects, there is provided a battery charger that includes supply means, battery voltage detection means, memory, updating means, calculating means, first detection means, second detection means, and determining means. The supplying means is provided for supplying a charge current to a battery. Generally, the battery voltage increases as the charging progresses. The battery voltage detection means is provided for periodically detecting the battery voltage. At least one battery voltage that has been previously detected by the battery voltage detection means is stored in the memory. The data stored in the memory is updated by the updating means whenever the battery voltage is newly detected by the battery voltage detection means. The difference between the newly detected battery voltage and the battery voltage stored in the memory is calculated by the calculating means whenever the battery voltage is newly detected by the battery voltage detection means. The difference is calculated by subtracting the previously detected battery voltage from the newly detected battery voltage.

The first detection means is provided for detecting that the value of the difference calculated by the calculating means has become equal to or exceeded a first critical value and a second critical value greater than the first critical value. The second detection means is provided for detecting that the value of the difference has become equal to or less than a third critical value after the difference had become equal to or exceeded the first critical value. The second detection means further detects that the value of the difference has become equal to or less than a fourth critical value greater than the third critical value after the difference had become equal to or exceeded the second critical value. The determining means determines that the battery has reached a fully charged condition (1) when the second detection means detects that the value of the difference has become equal to or less than the third critical value after the first detection means detects that the value of the difference has become equal to or exceeded the first critical value, or (2) when the second detection means detects that the value of the difference has become equal to or less than the fourth critical value after the first detection means detects that the value of the difference has become equal to or exceeded the second critical value.

According to another aspect of the invention, there is provided a battery charger that includes supplying means, battery voltage detection means, memory, and updating means as described above. The charger further includes first calculating means, second calculating means, first detection means, second detection means, and determining means.

The first calculating means calculates a first difference between the newly detected battery voltage and the battery voltage stored in the memory, and calculates the first difference whenever the battery voltage is newly detected by the battery voltage detection means. The second calculating means calculates a second difference between the first difference and an ever occurring minimum value of the voltage change, and calculates the second difference whenever the battery voltage is newly detected by the battery voltage detection means.

The first detection means is provided for detecting that a value of the second difference calculated by the second calculating means has become equal to or exceeded a first critical value and a second critical value. The second critical value is greater than the first critical value. The second detection means is provided for detecting that a value of the first difference has become equal to or less than a third critical value after the second difference had become equal to or exceeded the first critical value. Further, the second detection means detects that the value of the first difference has become equal to or less than a fourth critical value greater than the third critical value after the second difference had become equal to or exceeded the second critical value. The determining means determines that the battery has reached a fully charged condition (1) when the second detection means detects that the value of the first difference has become equal to or less than the third critical value after the first detection means detects that the value of the second difference has become equal to or exceeded the first critical value, or (2) when the second detection means detects that the value of the first difference has become equal to or less than the fourth critical value after the first detection means detects that the value of the second difference has become equal to or exceeded the second critical value.

According to still another aspect of the invention, there is provided a battery charger that includes supplying means, battery voltage detection means, memory, and updating means as described above. The charger further includes first calculating means, second calculating means, first detection means, second detection means, and determining means.

The first calculating means calculates a first difference between the newly detected battery voltage and the battery voltage stored in the memory. The first calculating means calculates the first difference whenever the battery voltage is newly detected by the battery voltage detection means. The second calculating means calculates a second difference between the first difference and an ever occurring minimum value of the voltage change. The second calculating means calculates the second difference whenever the battery voltage is newly detected by the battery voltage detection means.

The first detection means detects that a value of the second difference calculated by the second calculating means has become equal to or exceeded a first critical value and a second critical value greater than the first critical value. The second detection means detects that a value of the second difference has become equal to or less than a third critical value after the second difference had become equal to or exceeded the first critical value and that the value of the second difference has become equal to or less than a fourth critical value greater than the third critical value after the second difference had become equal to or exceeded the second critical value. The determining means determines that the battery has reached a fully charged condition (1) when the second detection means detects that the value of the second difference has become equal to or less than the third critical value after the first detection means detects that the value of the second difference has become equal to or exceeded the first critical value, or (2) when the second detection means detects that the value of the second difference has become equal to or less than the fourth critical value after the first detection means detects that the value of the second difference has become equal to or exceeded the second critical value.

According to further aspect of the invention, there is provided a battery charger that includes supplying means, battery voltage detection means, memory, and updating means as described above. The charger further includes calculating means, first detection means, second detection means, and determining means.

The calculating means calculates a difference between the newly detected battery voltage and the battery voltage stored in the memory. The calculating means calculates the difference whenever the battery voltage is newly detected by the battery voltage detection means. The memory further stores an ever occurring maximum value of the difference.

The first detection means detects that the maximum value has become equal to or exceeded a first critical value and a second critical value greater than the first critical value. The second detection means detects that the difference has fallen a third critical value or a fourth critical value greater than the third critical value from the maximum value. The determining means determines that the battery has reached a fully charged condition (1) when the second detection means detects that the difference has fallen the third critical value from the maximum value after the first detection means detects that the maximum value had become equal to or exceeded the first critical value but not exceeded the second critical value, and (2) when the second detection means detects that the difference has fallen the fourth critical value from the maximum value after the first detection means detects that the maximum value had become equal to or exceeded the second critical value.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Next, preferred embodiments of the present invention will be described while referring to the accompanying drawings.

Figure 1:
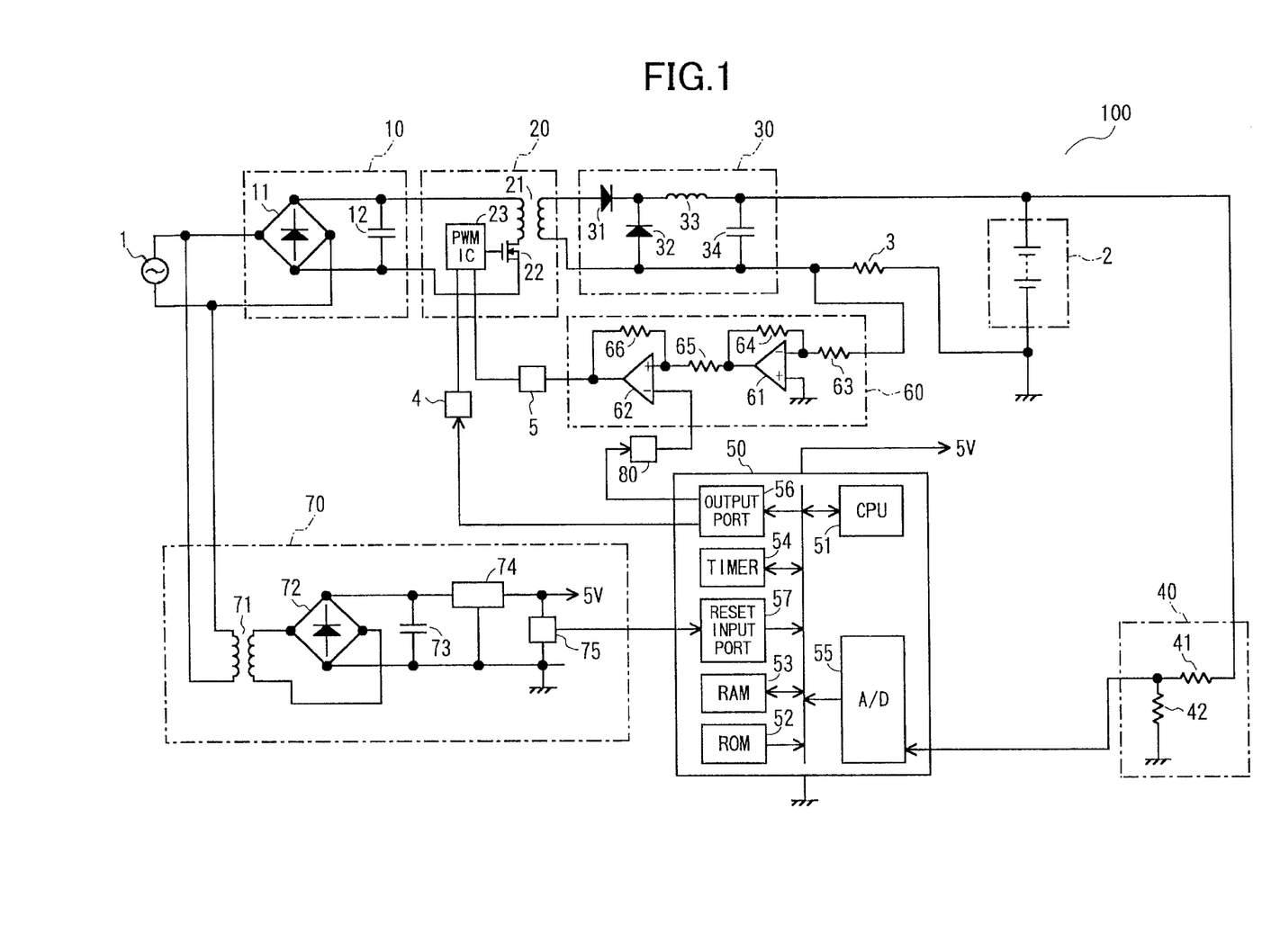
FIG. 1 is a block diagram showing a battery charger according to the present invention.

FIG. 1 shows a hardware arrangement of the battery charger according to a preferred embodiment of the present invention. To charge a battery 2 with the battery charger 100, the battery 2 is loaded into connection terminals, one being connected to the output of a rectifying/smoothing circuit 30

(to be described later), and the other to ground. The battery 2 consists of a plurality of cells connected in series.

The battery charger 100 includes a resistor 3 serving as a current detection means for detecting a charge current flowing in the battery 2. A rectifying/smoothing circuit 10 is connected to an A.C. power source 1 for converting the A.C. voltage to D.C. voltage. The circuit 10 includes a full-wave rectifier 11 and a smoothing capacitor 12. A switching circuit 20 is connected to the output of the rectifying/smoothing circuit 10 and includes a high frequency transformer 21, a MOSFET 22, and a PWM (pulse width modulation) control IC 23. This IC 23 changes the width of driving pulses applied to the MOSFET 22. With the switching actions performed by the MOSFET 22, pulsating voltage is developed at the secondary side of the transformer 21. Another rectifying/smoothing circuit 30 is connected to the secondary side of the transformer 21. The circuit 30 includes diodes 31, 32, a choke coil 33, and a smoothing capacitor 34. A battery voltage detection section 40, which is made up of two resistors 41 and 42 connected in series, is connected in parallel to the battery 2. With this configuration, the voltage across the battery 2 can be obtained from the voltage developed across the resistor 42.

The battery charger 100 further includes a microcomputer 50 having a CPU 51, a ROM 52, a RAM 53, a sampling timer 54, an A/D converter 55, an output port 56, and a reset input port 57, which are mutually connected by a bus. A charge current control section 60 is connected between the current detection section (resistor) 3 and the switching circuit 20 to maintain the charge current at a predetermined level. The charge current control section 60 includes cascade-connected operational amplifiers 61 and 62, and resistors 63 through 66.

A constant voltage power supply 70 is provided for supplying constant voltages to the microcomputer 50 and the charge current control section 60. The constant voltage power supply 70 includes a transformer 71, a full-wave rectifier 72, a smoothing capacitor 73, a three-terminal voltage regulator 74, and a reset IC 75. The reset IC 75 outputs a reset signal to the reset input port 57 to reset the microcomputer 50. A charge current setting section 80 is connected between the output port 56 of the microcomputer 50 and the inverting input terminal of the operational amplifier 62. The charge current setting section 80 is provided for setting the level of the charge current. This can be done by changing the voltage applied to the inverting input terminal of the operational amplifier 62 in response to the signal output from the microcomputer 50.

A photo-coupler 4 is connected between the output port 56 of the microcomputer 50 and the IC 23 of the switching circuit 20. The photo-coupler 4 is provided for transmitting a charge start signal and a charge stop signal fed from the output port 56 of the microcomputer 50 to the PWM control IC 23. Another photo-coupler 5 is connected between the output of the charge current control section 60 and the PWM control IC 23 for feeding the charge current signal back to the PWM control IC 23.

With the arrangement shown in FIG. 1, the fully charged condition of the battery 2 is detected as will be described below. In the following embodiments, an improved two-step detection method is used to detect the fully charged condition of the battery. The improved two-step detection method takes into account difference in the battery voltage charge characteristic of, for example, active and inactive batteries.

Figure 4A:
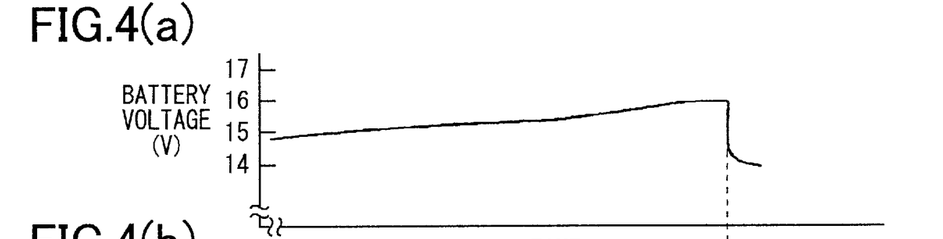
FIG. 4(a) is a graphical representation showing a battery voltage charge characteristic curve of an inactive battery.
Figure 4B:
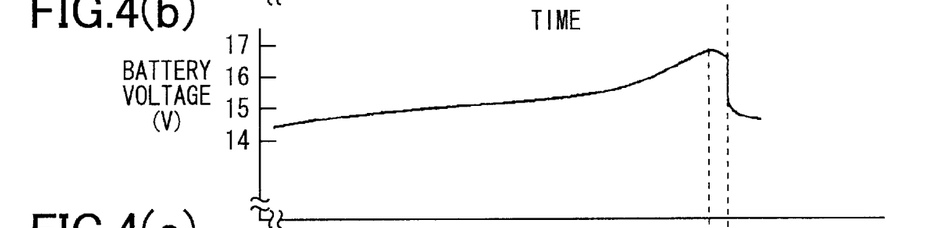
FIG. 4(b) is a graphical representation showing a battery voltage charge characteristic curve of an active battery.
Figure 4C:
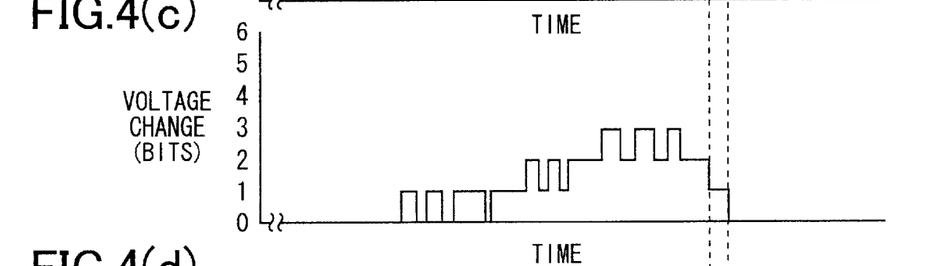
FIG. 4(c) is a graphical representation showing a battery voltage change characteristic of the inactive battery.
Figure 4D:
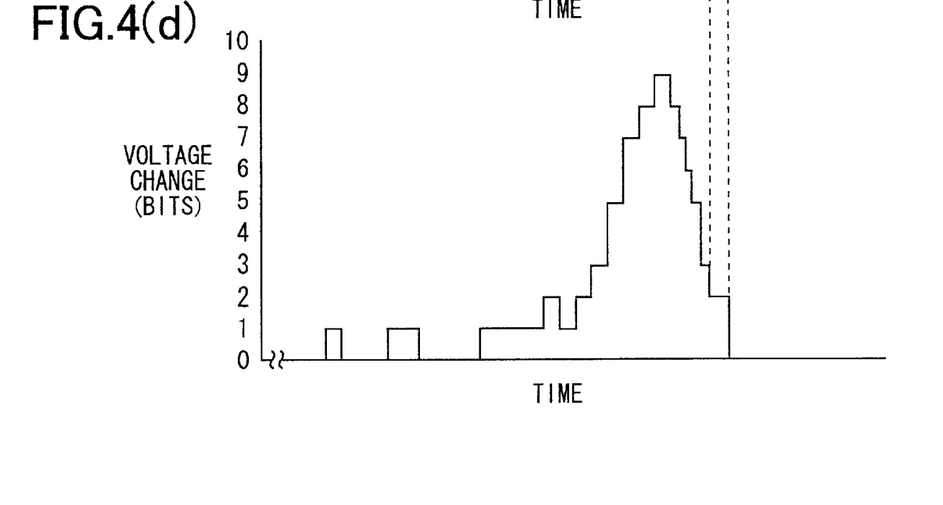
FIG. 4(d) is a graphical representation showing a battery voltage change characteristic of the active battery.

FIGS. 4(a) and 4(b) are charge characteristics of the inactive batteries and the active batteries, respectively, wherein the axis of abscissa represents charge time, and the axis of ordinate battery voltage. FIGS. 4(c) and 4(d) are voltage change characteristics of the inactive batteries and the active batteries, respectively, wherein the axis of abscissa represents charge time, and the axis of ordinate the amount of the voltage change expressed by the number of bits.

As shown in FIGS. 4(c) and 4(d), the voltage change of the inactive batteries and the active batteries reaches the peak before the battery voltage reaches the peak level. However, the peak level of the voltage change is different between the inactive batteries and the active batteries. In this example, the inactive batteries have a peak of 3 bits on the graph of FIG. 4(c) and the active batteries have a peak of 9 bits on the graph of FIG. 4(d).

In the conventional two-step detection method, the voltage change of the battery is first compared with a first critical value K. When the voltage change has exceeded the first critical value K, then it is compared with a second critical value S. The battery is determined to be fully charged when the voltage change of the battery falls below the second critical value S.

In the improved two-step detection method according to the invention, two critical values K1 and S1 are specifically set for inactive batteries. When the voltage change of the battery falls below the critical value S1 after having exceeded the critical value K1, the inactive battery is determined to be fully charged. Likewise, two critical values K2 and S2 are specifically set for active batteries. When the voltage change of the battery falls below the critical value S2 after having exceeded the critical value K2, the active battery is determined to be fully charged. With the voltage change characteristics of the inactive and active batteries in mind, the critical value K1 is set smaller than K2, and the critical value S1 is set smaller than S2.

More specifically, in the following embodiments, the critical value K1 for the inactive batteries is set to 3 (bits). To identify that the battery to be charged is an active battery, the critical value K2 for the active batteries needs to be greater than 3 (bits) but less than 9 (bits) as can be appreciated from the graphs of FIGS. 4(c) and 4(d). Accordingly, in the following embodiments, 6 (bits) is selected as the critical value K2 for the active batteries.

As to the inactive batteries, the fully charged condition will be properly detected when the critical value S1 is set to 0 (bit). Also, the fully charged condition of the active batteries will be properly detected when the critical value S2 is set to 2 (bits) as can be understood from FIG. 4(d).

With the use of two sets of critical values in the improved two-step detection method, the batteries can be charged to a fully charged condition regardless of whether the battery to be charged is inactive or active.

To obtain the battery voltage characteristic as shown in FIG. 4(a) or FIG. 4(b), the output of the battery voltage detecting section 40 is periodically sampled and the sampled voltage $V_{in}$ is subjected to analog-to-digital conversion in the A/D converter 55. Digital data corresponding to the sampled voltage $V_{in}$ is stored in the RAM 53. The RAM 53 also stores previously sampled and A/D converted six battery voltages $V_{i\text{-}06}$, $V_{i\text{-}05}$, ..., $V_{in\text{-}01}$, which are updated every time the battery voltage $V_{in}$ is newly sampled so that the most recent six battery voltages are stored.

To obtain the battery voltage change characteristic as shown in FIGS. 4(c) and 4(d), the microcomputer 50 calculates a voltage difference between the battery voltage $V_{in}$ and the battery voltage $V_{i\text{-}06}$ that was detected six-sampling times before. The voltage difference $\Delta V_{-06}$ ($=V_{in}-V_{i-06}$) represents a voltage change in a unit time, that is, gradient of the battery voltage characteristic curve.

Alternatively, the microcomputer 50 may further calculate a difference between the voltage change $\Delta V_{-06}$ and an ever occurring minimum voltage change $\Delta V_{min}$, which will be referred to as "deviated voltage change" ($=\Delta V_{-06}-\Delta V_{min}$), to obtain a deviated voltage change characteristic. Based on this characteristic, identification of inactive and active batteries and also determination of the fully charged condition of the batteries are carried out using four critical values K1', K2', S1' and S2'. The critical value K1' is used to identify inactive batteries, and the critical value K2' active batteries. The critical value S1' is used to determine the fully charged condition of the inactive batteries, and the critical value S2' the fully charged condition of the active batteries. As such, the critical values K1', K2', S1' and S2' correspond to K1, K2, S1 and S2, respectively, wherein the values K1', K2', S1' and S2' are set to be smaller values than the values K1, K2, S1 and S2, respectively.

Next, operation of the battery charger 100 according to the first embodiment will be described while referring to the flowchart shown in FIG. 2. Hereinafter, individual steps will be referred to with an "S" followed by the step number.

When the battery charger 100 is powered, the microcomputer 50 goes into a standby condition in which it is determined whether or not the battery 2 is loaded into the battery charger 100 (S101). When, by referring to the signal output from the voltage detection section 40, the microcomputer 50 determines that the battery 2 is loaded (S101:YES), then charging of the battery 2 is started (S102) Specifically, the microcomputer 50 outputs the charge start signal from the output port 56 to the PWM control IC 23 via the photo-coupler 4. At the same time, the microcomputer 50 applies a reference voltage $V_i$ to the operational amplifier 62 via the charge current setting section 80, so that the battery 2 is charged with a charge current I. At the time when the battery charging is started, an actual charge current flowing through the battery 2 is detected at the resistor 3. The reference voltage $V_i$ is subtracted from the voltage corresponding to the actual charge current detected at the resistor 3, and the resultant difference signal is fed back to the PWM control IC 23 via the photo-coupler 5.

More specifically, the width of the pulse applied to the high frequency transformer 21 is reduced when the actual charge current is greater than a reference charge current corresponding to the reference voltage $V_i$ whereas the width of the pulse applied to the high frequency transformer 21 is increased when the actual charge current is less than the reference charge current. The output from the secondary winding of the high frequency transformer 21 is subject to rectification and smoothing by the rectifying/smoothing circuit 30. In this way, a constant charge current I flows in the battery 2.

The microcomputer 50 samples the output of the battery voltage detection section 40 at every predetermined period and converts the sampled voltages to digital data in the A/D converter 55. The digital data on the most recent six sampled voltages are stored in the RAM 53. In S103, various values stored in the RAM 53 are initialized. That is, data to be recorded as the most recent six sampled voltages $V_{i-06}$, $V_{i-05}$, . . . , $V_{i-01}$ are initialized to zero. The minimum voltage change $\Delta V_{min}$ is set to infinite. Also, the maximum value in the A/D converter 55 is set to infinite.

The RAM 53 also stores a first set of critical values K1' and S1 for the inactive batteries, a second set of critical values K2' and S2 for the active batteries, a first voltage-increase-detection flag F1, and a second voltage-increase-detection flag F2. Both the first and second flags F1, F2 initially take value of "0" (S103). However, the first flag F1 is turned to "1" when detection is so made that the deviated voltage change has become equal to or exceeded the critical value K1'. The second flag F2 is turned to "1" when detection is so made that the deviated voltage change has become equal to or exceeded the critical value K2'.

Then, the battery voltage sampling timer 54 is started (S104). When the timer 54 has measured a sampling period of time $\Delta t$ (S105:YES), then the timer 54 is restarted (S106) for allowing the battery voltage to be sampled.

During the sampling period, the battery voltage $V_{in}$ is detected (S107), and the voltage change $\Delta V_{i-06}$ ($=V_{in}-V_{i-06}$) is calculated (S108). The voltage change $\Delta V_{i-06}$ indicates a difference in the battery voltage which occurred during six sampling periods ($6\Delta t$). If the second flag F2 has the value of "1" (S109:YES), the routine proceeds to S118. However, at the initial stage of charging, the second flag F2 takes a value of "0" as it is so set in S103. Therefore, the routine proceeds to S110 where it is determined whether or not the first flag F1 has the value of "1". If the first flag F1 has the value of "1" (S110:YES), then the routine proceeds to S116. The first flag F1 also takes a value of "0" at the initial stage of charging, so the routine proceeds to S111.

In S111, if the deviated voltage change ($\Delta V_{i-06}-\Delta V_{min}$) is determined less than the critical value K1' (S111:NO), then the routine proceeds to S112 where comparison is made between the voltage change $\Delta V_{i-06}$ and the minimum voltage change $\Delta V_{min}$. If the voltage change $\Delta V_{i-06}$ is smaller than the minimum voltage change $\Delta V_{min}$ (S112:YES), then the minimum voltage change $\Delta V_{min}$ is replaced by the voltage change $\Delta V_{i-06}$ to update the minimum voltage change $\Delta V_{min}$ (S113). Then, data for the detected battery voltages $V_{i-06}$ to $V_{i-01}$ are updated (S114). That is, $V_{i-06}$ is replaced by $V_{i-05}$, $V_{i-05}$ by $V_{i-04}$, $V_{i-04}$ by $V_{i-03}$, and so on. The $V_{i-01}$ is replaced by $V_{in}$. If the voltage change $\Delta V_{i-06}$ is equal to or greater than the minimum voltage change $\Delta V_{min}$ (S112:NO), the routine directly proceeds to S114 without executing S113. Then, upon execution of S114, the routine returns to S105 where whether the sampling period of time has expired or not is checked.

As the charging of the battery progresses, the deviated voltage change will become equal to or exceed the critical value K1' (S111:YES), then the process proceeds to S115 where the value of the first flag F1 is rewritten to "1" (S115) The value "1" of the first flag F1 assumes, for the time being, that the battery being charged is an inactive battery. However, this assumption is denied if the deviated voltage change has become equal to or exceeded the critical value K2' (S116:YES). That is, the battery 2 is finally determined to be an active battery, not inactive battery. At this time, the value of the flag F2 is rewritten to "1" (S117), and then the routine proceeds to S118. On the other hand, if the deviated voltage change is less than the critical value K2' (S116:NO), the assumption that the inactive battery is being charged is correct, and the routine proceeds to S119.

When it is determined that the active battery is being charged, the voltage change $\Delta V_{i-06}$ is compared with the critical value S2 (S118). The fact that the voltage change $\Delta V_{i-06}$ has become equal to or less than the critical value S2 (S118:YES) indicates that the battery has reached the fully charged condition. Therefore, the charge stop signal is applied to the PWM control IC 23 via the charge control signal transmitting section 4 and the battery charger 100 stops charging the battery 2 (S120). When the battery 2 is unloaded from the charger 100 (S121:YES), the routine returns to S101. If the voltage change $\Delta V_{i\text{-}06}$ is still greater than the critical value S2 (S118:NO), it is indicated that the fully charged condition has not yet been reached, so the routine proceeds to S112 to continue charging the battery.

In S116, when the deviated voltage change does not exceed the critical value K2' (S116:NO), the battery 2 is determined to be an inactive battery and the voltage change $\Delta V_{i\text{-}06}$ is compared with the critical value S1 (S119). If the voltage change $\Delta V_{i\text{-}06}$ has become equal to or less than the critical value S1 (S119:YES), it is determined that the inactive battery 2 has reached the fully charged condition. So the battery charger 100 stops charging the battery (S120). When the battery 2 is unloaded from the charger 100 (S121:YES), the routine returns to S101. The fact that the voltage change $\Delta V_{i\text{-}06}$ is still greater than the critical value S1 (S119:NO) indicates that the inactive battery has not yet been reached the fully charged condition, so the routine proceeds to S112.

As described, when the voltage change $\Delta V_{i\text{-}06}$ falls below the critical value S1 while only the first flag F1 has the value of "1", the inactive battery is determined to be in the fully charged condition. On the other hand, when both the first and second flags F1 and F2 have the value of "1", this means that the battery 2 is the active battery. In this case, the active battery is determined to be fully charged when the voltage change $\Delta V_{i\text{-}06}$ falls below the critical value S2.

In this manner, the fully charged condition of the battery 2 is reliably and accurately detected regardless of whether the battery 2 is active or inactive, thereby preventing the batteries from overcharging and undercharging.

In the first embodiment, the battery 2 is determined to be active or inactive based on the deviated voltage change ($\Delta V_{i\text{-}06} - \Delta V_{min}$), however, this determination may be made based on the voltage change $\Delta V_{i\text{-}06}$ while using the critical values K1 and K2. In this case, the critical values K1 and K2 to be compared with the voltage change $\Delta V_{i\text{-}06}$ must be set larger than the critical values K1' and K2', respectively.

Next, operation of the battery charger 100 according to the second embodiment will be described while referring to the flowchart of FIG. 3. In the first embodiment, detection of the fully charged condition is made when the voltage change falls below the critical values S1, S2 after the deviated voltage change has become equal to or exceeded at least one of the critical values K1' and K2'. However, according to the second embodiment, the fully charged condition is determined when the voltage change falls a predetermined value from the maximum voltage change. In the second embodiment, critical values P1, P2, Q1 and Q2 are used, wherein P1<P2, Q1<Q2.

Figure 2:
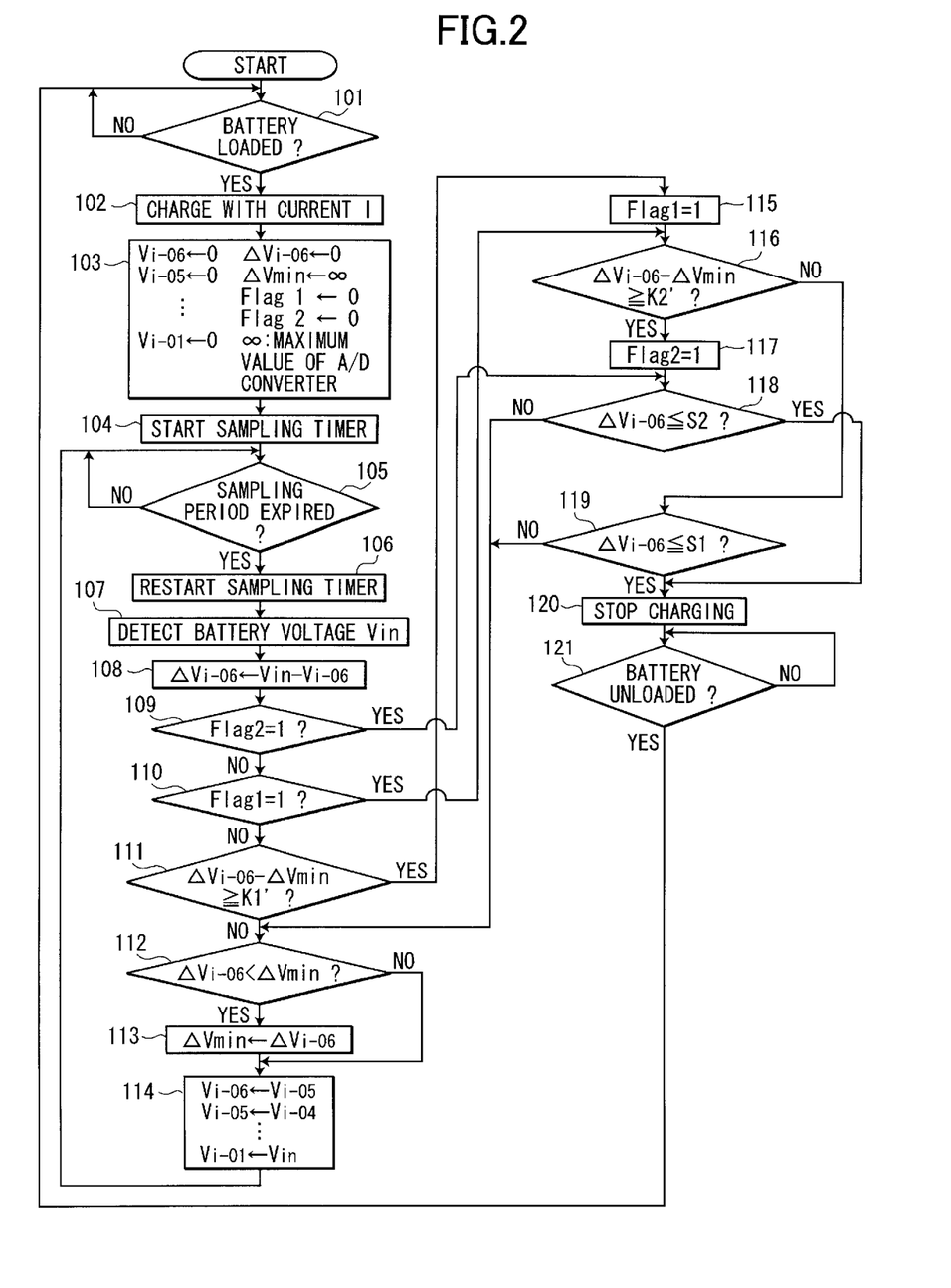
FIG. 2 is a flowchart illustrating operations executed according to a first embodiment of the present invention.
Figure 3:
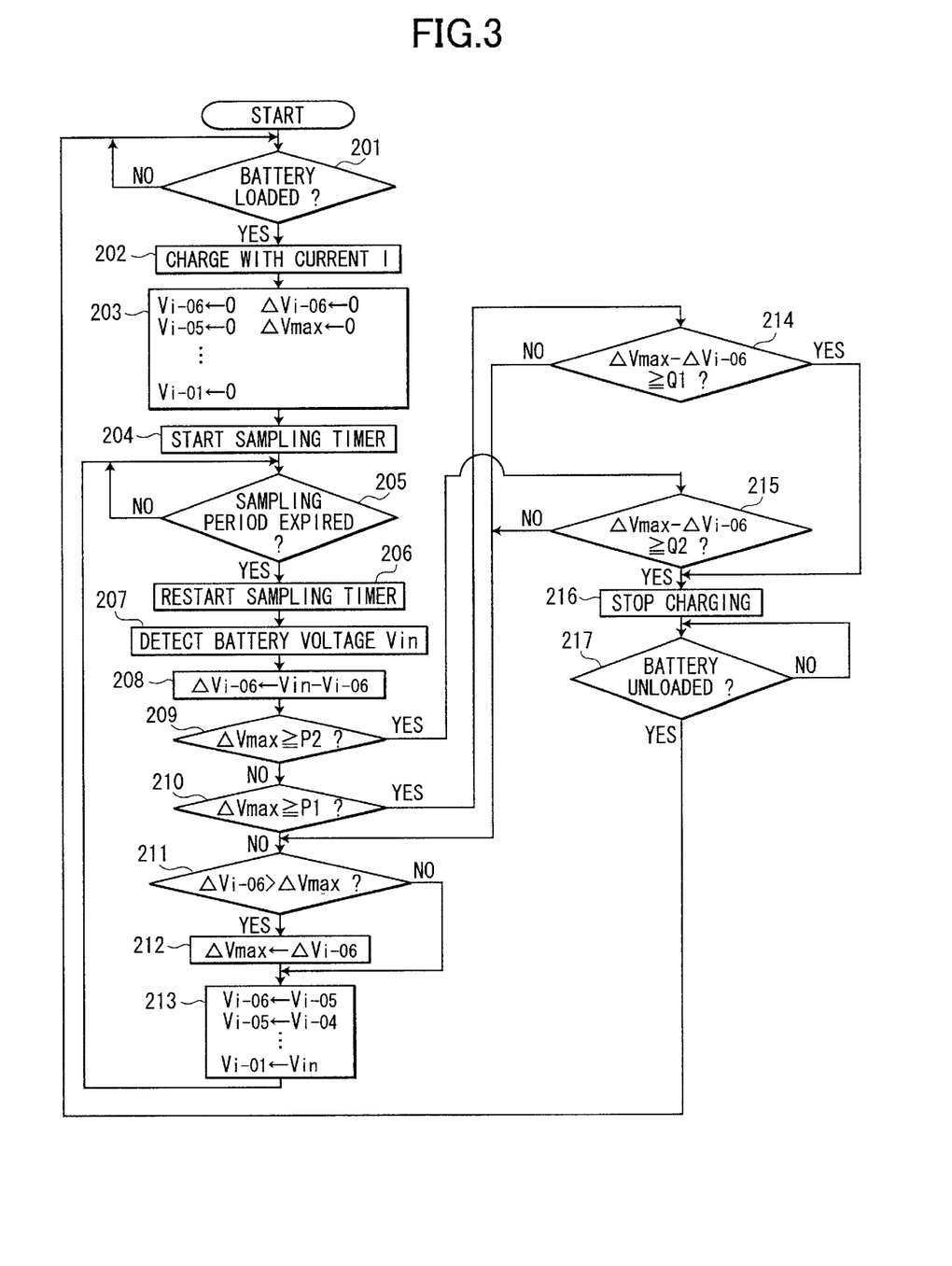
FIG. 3 is a flowchart illustrating operations executed according to a second embodiment of the present invention.

The processes of S201 through S208 in FIG. 3 are basically the same as those of S101 through S108 in FIG. 2, and so their explanation will be omitted to avoid duplicate description. In S203, a value for the maximum voltage change $\Delta V_{max}$ is initialized to 0.

After S209, when the maximum voltage change $\Delta V_{max}$ is equal to or greater than the critical value P2 (S209:YES), then the battery 2 is determined to be an active battery, and the routine proceeds to S215. On the other hand, when the maximum voltage change $\Delta V_{max}$ is less than the critical value P2 (S209:NO), then the routine proceeds to S210. In S210, when the maximum voltage change $\Delta V_{max}$ is equal to or greater than the critical value P1 (S210:YES), it is assumed that the battery 2 is an inactive battery, and the routine proceeds to S214. On the other hand, if the maximum voltage change $\Delta V_{max}$ is less than the critical value P1 (S210:NO), then the routine proceeds to S211.

In S211, the voltage change $\Delta V_{i\text{-}06}$ is compared with the maximum voltage change $\Delta V_{max}$. When the voltage change $\Delta V_{i\text{-}06}$ is greater than the maximum voltage change $\Delta V_{max}$ (S211:YES), then the maximum voltage change $\Delta V_{max}$ is replaced by the voltage change $\Delta V_{i\text{-}06}$ to update the maximum voltage change $\Delta V_{max}$ (S212), and the process proceeds to S213. On the other hand, the maximum voltage change $\Delta V_{max}$ is greater than the voltage change $\Delta V_{i\text{-}06}$ (S211:NO), then the routine directly proceeds to S213, wherein the data on the most recent six battery voltages $V_{i\text{-}06}$ to $V_{i\text{-}01}$ are updated in the same manner as S114 of FIG. 2.

In S214, when the voltage change $\Delta V_{i\text{-}06}$ falls the critical value Q1 from the maximum voltage change $\Delta V_{max}$ (S214:YES), then it is determined that the inactive battery has reached the fully charged condition, so the charging is stopped (S216). When the battery 2 is unloaded (S217:YES), the routine returns to S201. If the voltage change $\Delta V_{i\text{-}06}$ does not fall the critical value Q1 from the maximum voltage change $\Delta V_{max}$ (S214:NO), then the process returns to S211.

In S215, when the voltage change $\Delta V_{i\text{-}06}$ falls the critical value Q2 from the maximum voltage change $\Delta V_{max}$ (S215:YES), then it is determined that the active battery has reached the fully charged condition, so the charging is stopped (S216). When the battery 2 is unloaded (S217:YES), the routine returns to S201. If the voltage change $\Delta V_{i\text{-}06}$ does not fall the critical value Q1 from the maximum voltage change $\Delta V_{max}$ (S214:NO), then the process returns to S211.

In the second embodiment, the battery 2 is determined active or inactive based on the level of the maximum voltage change $\Delta V_{max}$ reached during charging. Then, the critical values Q1 and Q2 are selectively used to determine if the battery has reached the fully charged condition. In the second embodiment, the fully charged condition can be reliably and correctly detected regardless of whether the battery 2 is the active or inactive in the similar manner as in the first embodiment.

While the invention has been described in detail with reference to specific embodiments thereof, it would be apparent to those skilled in the art that various changes and modifications may be made therein without departing from the spirit of the invention.

For example, the above embodiments are described for charging the active batteries and inactive batteries. However, the present invention can also be applied to charging other types of batteries with different charging characteristics, such the nickel-cadmium batteries and the nickel-hydrogen batteries.

What is claimed is:

1. A battery charger comprising:

supplying means for supplying a charge current to a battery;

battery voltage detection means for periodically detecting a battery voltage across the battery;

a memory storing data on at least one battery voltage that is detected by said battery voltage detection means;

updating means for updating the data stored in said memory whenever the battery voltage is newly detected by said battery voltage detection means;

calculating means for calculating a difference between the newly detected battery voltage and the battery voltage stored in said memory, said calculating means calculating the difference whenever the battery voltage is newly detected by said battery voltage detection means;

first detection means for detecting that a value of the difference calculated by said calculating means has become equal to or exceeded a first critical value and a second critical value greater than the first critical value;

second detection means for detecting that the value of the difference has become equal to or less than a third critical value after the difference had become equal to or exceeded the first critical value and that the value of the difference has become equal to or less than a fourth critical value greater than the third critical value after the difference had become equal to or exceeded the second critical value; and determining means for determining that the battery has reached a fully charged condition when said second detection means detects that the value of the difference has become equal to or less than the third critical value after said first detection means detects that the value of the difference has become equal to or exceeded the first critical value, or when said second detection means detects that the value of the difference has become equal to or less than the fourth critical value after said first detection means detects that the value of the difference has become equal to or exceeded the second critical value.

2. The battery charger according to claim 1, wherein said first detection means first detects that the value of the difference has become equal to or exceeded the first critical value, and thereafter detects that the value of the difference has become equal to or exceeded the second critical value.

3. The battery charger according to claim 1, further comprising first indication means for indicating that the battery is an inactive battery when detection implemented by said first detection means indicates that the value of the difference has become equal to or exceeded the first critical value but has not become equal to or exceeded the second critical value, and a second indicating means for indicating that the battery is an active battery when detection implemented by said first detection means indicates that the value of the difference has become equal to or exceeded the second critical value.

4. A battery charger comprising:

supplying means for supplying a charge current to a battery;

battery voltage detection means for periodically detecting a battery voltage across the battery;

a memory storing data on at least one battery voltage that is detected by said battery voltage detection means;

updating means for updating the data stored in said memory whenever the battery voltage is newly detected by said battery voltage detection means;

first calculating means for calculating a first difference between the newly detected battery voltage and the battery voltage stored in said memory, said first calculating means calculating the first difference whenever the battery voltage is newly detected by said battery voltage detection means;

second calculating means for calculating a second difference between the first difference and an ever occurring minimum value of the voltage change, said second calculating means calculating the second difference whenever the battery voltage is newly detected by said battery voltage detection means;

first detection means for detecting that a value of the second difference calculated by said second calculating means has become equal to or exceeded a first critical value and a second critical value greater than the first critical value;

second detection means for detecting that a value of the first difference has become equal to or less than a third critical value after the second difference had become equal to or exceeded the first critical value and that the value of the first difference has become equal to or less than a fourth critical value greater than the third critical value after the second difference had become equal to or exceeded the second critical value; and determining means for determining that the battery has reached a fully charged condition when said second detection means detects that the value of the first difference has become equal to or less than the third critical value after said first detection means detects that the value of the second difference has become equal to or exceeded the first critical value, or when said second detection means detects that the value of the first difference has become equal to or less than the fourth critical value after said first detection means detects that the value of the second difference has become equal to or exceeded the second critical value.

5. The battery charger according to claim 4, wherein said first detection means first detects that the value of the second difference has become equal to or exceeded the first critical value, and thereafter detects that the value of the second difference has become equal to or exceeded the second critical value.

6. The battery charger according to claim 4, further comprising first indication means for indicating that the battery is an inactive battery when detection implemented by said first detection means indicates that the value of the second difference has become equal to or exceeded the first critical value but has not become equal to or exceeded the second critical value, and a second indicating means for indicating that the battery is an active battery when detection implemented by said first detection means indicates that the value of the second difference has become equal to or exceeded the second critical value.

7. A battery charger comprising:

supplying means for supplying a charge current to a battery;

battery voltage detection means for periodically detecting a battery voltage across the battery;

a memory storing data on at least one battery voltage that is detected by said battery voltage detection means;

updating means for updating the data stored in said memory whenever the battery voltage is newly detected by said battery voltage detection means;

first calculating means for calculating a first difference between the newly detected battery voltage and the battery voltage stored in said memory, said first calculating means calculating the first difference whenever the battery voltage is newly detected by said battery voltage detection means;

second calculating means for calculating a second difference between the first difference and an ever occurring minimum value of the voltage change, said second calculating means calculating the second difference whenever the battery voltage is newly detected by said battery voltage detection means;

first detection means for detecting that a value of the second difference calculated by said second calculating means has become equal to or exceeded a first critical value and a second critical value greater than the first critical value;

second detection means for detecting that a value of the second difference has become equal to or less than a third critical value after the second difference had become equal to or exceeded the first critical value and that the value of the second difference has become equal to or less than a fourth critical value greater than the third critical value after the second difference had become equal to or exceeded the second critical value; and determining means for determining that the battery has reached a fully charged condition when said second detection means detects that the value of the second difference has become equal to or less than the third critical value after said first detection means detects that the value of the second difference has become equal to or exceeded the first critical value, or when said second detection means detects that the value of the second difference has become equal to or less than the fourth critical value after said first detection means detects that the value of the second difference has become equal to or exceeded the second critical value.

8. The battery charger according to claim 7, wherein said first detection means first detects that the value of the second difference has become equal to or exceeded the first critical value, and thereafter detects that the value of the second difference has become equal to or exceeded the second critical value.

9. The battery charger according to claim 7, further comprising first indication means for indicating that the battery is an inactive battery when detection implemented by said first detection means indicates that the value of the second difference has become equal to or exceeded the first critical value but has not become equal to or exceeded the second critical value, and a second indicating means for indicating that the battery is an active battery when detection implemented by said first detection means indicates that the value of the second difference has become equal to or exceeded the second critical value.

10. A battery charger comprising:

supplying means for supplying a charge current to a battery;

battery voltage detection means for periodically detecting a battery voltage across the battery;

a memory storing data on at least one battery voltage that is detected by said battery voltage detection means;

updating means for updating the data stored in said memory whenever the battery voltage is newly detected by said battery voltage detection means;

calculating means for calculating a difference between the newly detected battery voltage and the battery voltage stored in said memory, said calculating means calculating the difference whenever the battery voltage is newly detected by said battery voltage detection means, said memory further storing an ever occurring maximum value of the difference;

first detection means for detecting that the maximum value has become equal to or exceeded a first critical value and a second critical value greater than the first critical value;

second detection means for detecting that the difference has fallen a third critical value or a fourth critical value greater than the third critical value from the maximum value; and determining means for determining that the battery has reached a fully charged condition when said second detection means detects that the difference has fallen the third critical value from the maximum value after said first detection means detects that the maximum value had become equal to or exceeded the first critical value but not exceeded the second critical value, and when said second detection means detects that the difference has fallen the fourth critical value from the maximum value after said first detection means detects that the maximum value had become equal to or exceeded the second critical value.

11. The battery charger according to claim 10, wherein said first detection means first detects that the maximum value has become equal to or exceeded the second critical value, and thereafter detects that the maximum value has become equal to or exceeded the first critical value.

* * * * *

UNITED STATES PATENT AND TRADEMARK OFFICE
CERTIFICATE OF CORRECTION

PATENT NO.     : 6,420,853 B1  Page 1 of 1
DATED          : July 16, 2002
INVENTOR(S)    : Hidekazu Harada, Kenrou Ishimaru and Nobuhiro Takano It is certified that error appears in the above-identified patent and that said Letters Patent is hereby corrected as shown below:

<u>Title page,</u>
Item [54], Title should read -- BATTERY CHARGER CAPABLE OF ACCURATELY DETERMINING FULLY CHARGED CONDITION REGARDLESS OF BATTERIES WITH DIFFERENT CHARGE CHARACTERISTICS --

Signed and Sealed this

Thirty-first Day of December, 2002

JAMES E. ROGAN
*Director of the United States Patent and Trademark Office*